United States Patent
Ono et al.

(10) Patent No.: US 8,185,286 B2
(45) Date of Patent: May 22, 2012

(54) TWO-WHEELED MOTOR VEHICLE BRAKE CONTROL METHOD AND BRAKE CONTROL SYSTEM

(75) Inventors: Shunsaku Ono, Yokohama (JP); Takahiro Ogawa, Yokohama (JP); Helge Westerfeld, Yokohama (JP); Manabu Kanno, Yokohama (JP)

(73) Assignee: Bosch Corporation, Tokyo (JP)

( * ) Notice: Subject to any disclaimer, the term of this patent is extended or adjusted under 35 U.S.C. 154(b) by 964 days.

(21) Appl. No.: 12/162,626

(22) PCT Filed: Feb. 8, 2006

(86) PCT No.: PCT/JP2006/302149
§ 371 (c)(1),
(2), (4) Date: Jul. 30, 2008

(87) PCT Pub. No.: WO2007/091312
PCT Pub. Date: Aug. 16, 2007

(65) Prior Publication Data
US 2009/0055066 A1    Feb. 26, 2009

(51) Int. Cl.
*G06F 7/70* (2006.01)
(52) U.S. Cl. ........ 701/70; 180/65.1; 180/227; 188/1.12; 188/5; 188/277; 280/11.231; 280/259; 280/304
(58) Field of Classification Search ............ 701/70; 180/65.1, 227; 188/1.12, 5, 277; 280/11.231, 280/250, 304
See application file for complete search history.

(56) References Cited

U.S. PATENT DOCUMENTS

| | | | |
|---|---|---|---|
| 3,871,713 A | 3/1975 | Lister | |
| 5,116,108 A | 5/1992 | Sigl et al. | |
| 5,261,730 A | 11/1993 | Steiner et al. | |
| 5,324,102 A * | 6/1994 | Roll et al. | 303/137 |
| 5,386,366 A | 1/1995 | Roll et al. | |
| 6,672,437 B2 | 1/2004 | Beringer | |
| 6,685,282 B2 | 2/2004 | Sakamoto | |
| 7,302,331 B2 | 11/2007 | Meyers et al. | |
| 7,653,471 B2 | 1/2010 | Mattson et al. | |
| 7,841,671 B2 | 11/2010 | Nakayama et al. | |
| 2007/0185623 A1 | 8/2007 | Chen et al. | |
| 2008/0281487 A1 | 11/2008 | Milot | |
| 2009/0048753 A1 | 2/2009 | Ogawa et al. | |
| 2009/0055066 A1 | 2/2009 | Ono et al. | |
| 2010/0138122 A1 | 6/2010 | Westerfeld et al. | |
| 2010/0145574 A1 | 6/2010 | Mattson et al. | |

FOREIGN PATENT DOCUMENTS

| | | |
|---|---|---|
| JP | 5-97085 A | 4/1993 |
| JP | 7-242166 A | 9/1995 |
| JP | 2727907 B2 | 12/1997 |
| JP | 2002-29397 A | 1/2002 |
| JP | 200229403 A | 1/2002 |
| JP | 3416819 B2 | 4/2003 |

* cited by examiner

*Primary Examiner* — Thomas Black
*Assistant Examiner* — Luke Huynh
(74) *Attorney, Agent, or Firm* — Ronald E. Greigg

(57) ABSTRACT

To reliably prevent re-lifting of a rear wheel immediately after landing of the rear wheel.

When it is determined that output of a detection signal corresponding to detection of lifting of a rear wheel has ended (S102), brake pressure—and specifically a pressure increase gradient of a wheel cylinder pressure of a front wheel—is reduced, and the pressure increase gradient that has been reduced is maintained until it is determined that vehicle body deceleration has fallen below a predetermined value K1 (S108, S110), whereby re-lifting of the rear wheel caused by an increase in brake pressure at a high pressure increase gradient after landing of the rear wheel can be reliably prevented.

4 Claims, 4 Drawing Sheets

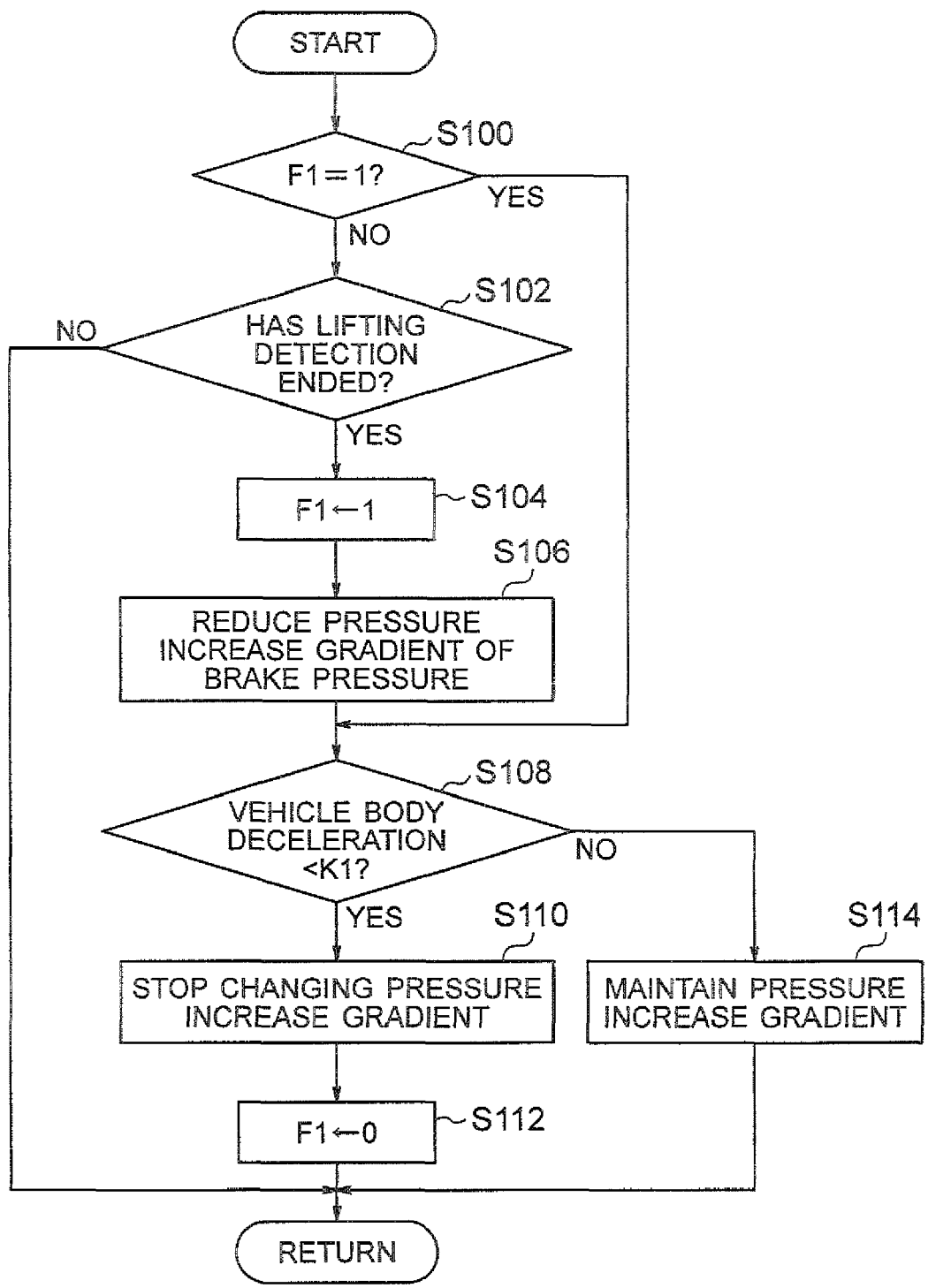

TWO-WHEELED MOTOR VEHICLE BRAKE CONTROL METHOD AND BRAKE CONTROL SYSTEM

BACKGROUND OF THE INVENTION

1. Field of the Invention

The present invention relates to a two-wheeled motor vehicle brake control method and system and in particular to the securement of high safety with respect to rear wheel lifting.

2. Description of the Related Art

Conventionally, it has been well known that, in two-wheeled motor vehicles, the larger the ratio between the height of the center of gravity of the vehicle and the inter-axial distance between the front and rear wheels is, the easier it is for the phenomenon of so-called lifting of the rear wheel to occur. Additionally, various coping technologies have been proposed with respect to such rear wheel lifting.

For example, in Japanese Patent No. 3,416,819, there is disclosed a technology that detects rear wheel lifting on the basis of various conditions, such as vehicle deceleration and a drop in the velocity of the rear wheel, and adjusts the brake force of the brakes.

However, it is fundamental for various types of control of brake force with respect to rear wheel lifting that have conventionally been proposed to focus just on the detection of rear wheel lifting at a given point in time and perform control of the brake pressure at that point in time. Consequently, for example, because of so-called antilock brake control immediately after rear wheel lifting has been detected, immediately after control of the brake force is performed and rear wheel lifting no longer becomes detected, or in other words immediately after the rear wheel has landed, it is common to allow a brake operation by an amount of change in the brake pressure that is the same as immediately before rear wheel lifting occurs. Incidentally, in this case, depending on various conditions such as the size and weight of the vehicle, there is also the potential for re-lifting of the rear wheel to immediately occur, and from the point of reliable securement of safety with respect to the vehicle and the rider, it is desired that effective brake control be performed with respect also to the potential for such a situation to occur.

Related application Ser. No. 12/161,367, filed Jul. 18, 2008, currently pending and allowed; Ser. No. 12/162,223, filed Jul. 25, 2008, currently pending; Ser. No. 12/161,370, filed Jul. 18, 2008, currently pending; and Ser. No. 12/162,220, filed Jul. 25, 2008, currently pending, are directed to similar subject matter. The '367 application is directed to a brake control method and system which provides improved controllability with respect to rear wheel lifting; the '223 application is directed to a brake control method and system that can reliably control and prevent rear wheel lifting caused by an abrupt brake operation; the '370 application is directed to the rapid securement of the safety of a vehicle with respect to rear wheel lifting; and the '220 application is directed to a two-wheeled motor vehicle brake control method and system for the rapid securement of the safety of a vehicle with respect to rear wheel lifting.

SUMMARY OF THE INVENTION

The present invention has been made in view of the above-described situation and provides a two-wheeled motor vehicle brake control method and system that can reliably prevent re-lifting of a rear wheel immediately after landing of the rear wheel.

According to a first aspect of the present invention, there is provided a two-wheeled motor vehicle brake control method comprising reducing a pressure increase gradient of a wheel cylinder pressure of a front wheel immediately after lifting of a rear wheel has been detected.

In this configuration, it is preferable for reduction of the pressure increase gradient to start after landing of the rear wheel and for the pressure increase gradient that has been reduced to be maintained until it is determined that vehicle body deceleration has fallen below a predetermined value.

According to a second aspect of the present invention, there is provided a two-wheeled motor vehicle brake control system configured to be capable of transmitting oil pressure arising in a front brake master cylinder in response to operation of a first brake operator to a front wheel cylinder via an oil pressure system, capable of transmitting oil pressure arising in a rear brake master cylinder in response to operation of a second brake operator to a rear wheel cylinder via an oil pressure system, and capable of discharging brake fluid of the front wheel cylinder to a front reservoir as desired, wherein the brake control system is configured to determine whether or not output of a detection signal that is generated by detection of lifting of a rear wheel has ended and, when it is determined that output of the detection signal has ended, reduce a pressure increase gradient of a wheel cylinder pressure of a front wheel.

BRIEF DESCRIPTION OF THE DRAWINGS

FIG. 2 is a sub-routine flowchart showing a processing procedure of first brake control that is executed by an electronic control unit of the two-wheeled motor vehicle brake control system shown in FIG. 1;

DETAILED DESCRIPTION OF THE PREFERRED EMBODIMENTS

Below, an embodiment of the present invention will be described with reference to FIG. 1 to FIG. 4.

It will be noted that the members and arrangements described below are not intended to limit the invention and can be variously modified within the scope of the gist of the invention.

Figure 1:
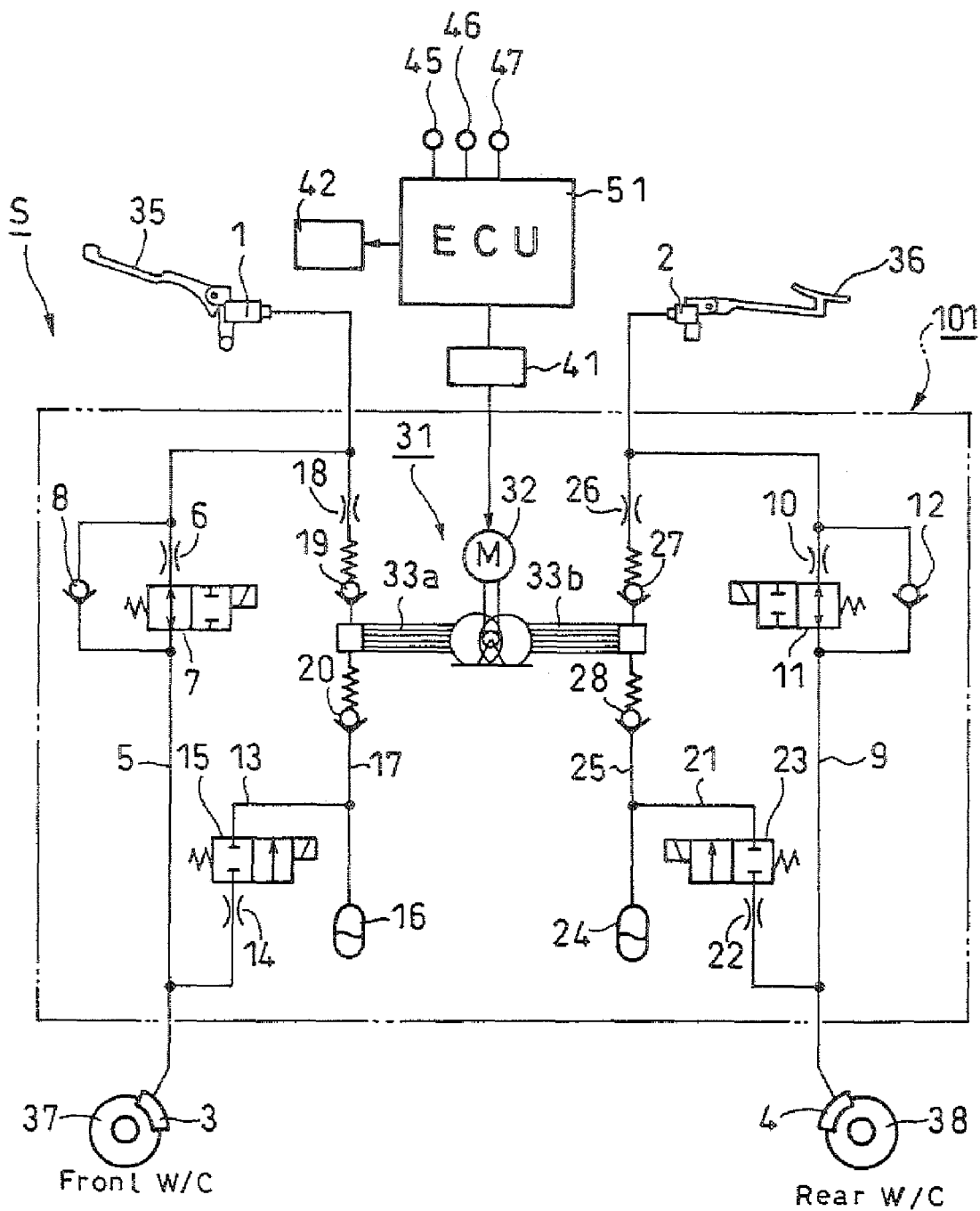
FIG. 1 is a configurable diagram showing an example of the configuration of a two-wheeled motor vehicle brake control system in an embodiment of the present invention.

First, an example of the configuration of a two-wheeled motor vehicle brake control system in the embodiment of the present invention will be described with reference to FIG. 1.

This two-wheeled motor vehicle brake control system S is broadly divided into a front brake master cylinder 1 that is disposed so as to be capable of converting the operational force of a brake handle 35 serving as a first brake operator into oil pressure, a rear brake master cylinder 2 that is disposed so as to be capable of converting the operational force of a brake pedal 36 serving as a second brake operator into oil pressure, a front wheel cylinder 3 that imparts brake force to a front wheel 37 in response to the oil pressure from the front brake master cylinder 1, a rear wheel cylinder 4 that imparts brake force to a rear wheel 38 in response to the oil pressure from the rear brake master cylinder 2, and an antilock brake control system 101; the antilock brake control system 101 is disposed between the front and rear brake master cylinders 1 and 2 and the front and rear wheel cylinders 3 and 4.

The front brake master cylinder 1 and the front wheel cylinder 3 are interconnected by a first main oil pressure tube 5, and a front main oil pressure tube-use throttle 6 and a first electromagnetic valve 7 that is ordinarily in an opened state are disposed in order from the front brake master cylinder 1 side midway along the first main oil pressure tube 5. Moreover, a front main oil pressure tube-use check valve 8 is disposed so as to bypass the front main oil pressure tube-use throttle 6 and the first electromagnetic valve 7 and in a direction where it deters the reverse flow of brake oil (rake fluid) from the front wheel cylinder 3 to the front brake master cylinder 1.

The rear brake master cylinder 2 and the rear wheel cylinder 4 are interconnected by a second ma oil pressure tube 9, and a rear main oil pressure tube-use throttle 10 and a second electromagnetic valve 11 that is ordinarily in an opened state are disposed in order from the rear brake master cylinder 2 side midway along the second main oil pressure tube 9. Moreover, a rear main oil pressure tube-use check valve 12 is disposed so as to bypass the rear main oil pressure tube-use throttle 10 and the second electromagnetic valve 11 and in a direction where it deters the reverse flow of brake oil from the rear wheel cylinder 4 to the rear brake master cylinder 2.

Further, a front reservoir connection-use oil pressure tube 13 is connected to an appropriate position of the first main oil pressure tube 5 between the first electromagnetic valve 7 and the front wheel cylinder 3, a front reservoir-use throttle 14 and a front reservoir inflow control-use electromagnetic valve 15 are disposed in order from the front wheel cylinder 3 side midway along the front reservoir connection-use oil pressure tube 13, and a front reservoir 16 is connected via these. Here, the front reservoir inflow control-use electromagnetic valve 15 is ordinarily in a closed state.

Moreover, a front return-use oil pressure tube 17 that is communicated with the front brake master cylinder 1 is connected to the front reservoir connection-use oil pressure tube 13 at an appropriate position between the front reservoir inflow control-use electromagnetic valve 15 and the front reservoir 16, and a front return path-use throttle 18, a first front return path-use check valve 19 and a second front return path-use check valve 20 are disposed in order from the front brake master cylinder 1 side midway along the front return-use oil pressure tube 17.

Further, basically similar to the configuration of the aforementioned first main oil pressure tube 5, a rear reservoir connection-use oil pressure tube 21 is connected to an appropriate position of the second main oil pressure tube 9 between the second electromagnetic valve 11 and the rear wheel cylinder 4, a rear reservoir-use throttle 22 and a rear reservoir inflow control-use electromagnetic valve 23 are disposed in order from the rear wheel cylinder 4 side midway along the rear reservoir connection-use oil pressure tube 21, and a rear reservoir 24 is connected via these. Here, the rear reservoir inflow control-use electromagnetic valve 23 is ordinarily in a closed state.

Moreover, a rear return-use oil pressure tube 25 that is communicated with the rear brake master cylinder 2 is connected to the rear reservoir connection-use oil pressure tube 21 at an appropriate position between the rear reservoir inflow control-use electromagnetic valve 23 and the rear reservoir 24, and a rear return path-use throttle 26, a first rear return path-use check valve 27 and a second rear return path-use check valve 28 are disposed in order from the rear brake master cylinder 2 side midway along the front return-use oil pressure tube 25.

Moreover, an oil pressure pump device 31 that is shared between the front brake and the rear brake is disposed in the antilock brake control system 101. That is, the oil pressure pump device 31 is generally configured by a motor 32 and two plungers 33a and 33b that are reciprocally moved by an unillustrated fixed cam that is fixedly attached to an output shaft (not shown) of the motor 32.

Additionally, the one plunger 33a is connected between the first front return path-use check valve 19 and the second front return path-use check valve 20, the other plunger 33b is connected between the first rear return path-use check valve 27 and the second rear return path-use check valve 28, and the brake oil of the front reservoir 16 is sucked up and refluxed to the front brake master cylinder 1 and the brake oil of the rear reservoir 24 is sucked up and refluxed to the rear brake master cylinder 2 by the reciprocating motion of the plungers 33a and 33b.

Control of the operation of each of the first and second electromagnetic valves 7 and 11, the front reservoir inflow control-use electromagnetic valve 15, the rear reservoir inflow control-use electromagnetic valve 23 and the motor 32 is performed by an electronic control unit (notated as "ECU" in FIG. 1) 51.

The electronic control unit 51 is configured to be disposed with a microcomputer (not shown) that has a publicly known/commonly known configuration and memory elements (not shown) such as a RAM and a ROM.

The electronic control unit 51 executes various control programs for controlling the traveling of the vehicle that are stored in the unillustrated memory elements and performs various operation controls necessary for the driving and traveling of the vehicle. Examples of such operation controls of the vehicle include engine control, ABS control (Antilock Brake System), processing to monitor the wheel velocities for determining whether or not there is an abnormality in wheel velocity sensors, processing to detect rear wheel lifting, and processing to detect skidding of the front wheel. Moreover, in the embodiment of the present invention, later-described brake control processing is executed.

In order to perform the aforementioned control processing, detection signals of wheel velocity sensors 45 and 46 that are correspondingly disposed in order to detect the wheel velocities of the front wheel 37 and the rear wheel 38 and a detection signal of a pressure sensor 47 that detects the pressure inside the front wheel cylinder 3 are inputted to the electronic control unit 51.

Moreover, detection signals of a brake lever actuation switch (not shown) that detects actuation of the brake handle 35 and a brake pedal actuation switch (not shown) that detects actuation of the brake pedal 36 are also inputted to the electronic control unit 51.

Further, a motor drive circuit 41 that generates and outputs a drive signal with respect to the motor 32 in response to a control signal from the electronic control unit 51 is disposed.

Moreover, an electromagnetic valve drive circuit 42 that controls the driving of the first and second electromagnetic valves 7 and 11, the front reservoir inflow control-use electromagnetic valve 15 and the rear reservoir inflow control-use electromagnetic valve 23 in response to control signals from the electronic control unit 51 is disposed. It will be noted that, in FIG. 1, the connections between the electromagnetic valve drive circuit 42 and the respective electromagnetic valves are omitted in order to simplify the drawing and make the drawing easier to understand.

It will be noted that the basic operation of the brake control system S of the aforementioned configuration is the same as that of this type of publicly known/commonly known brake control system, so detailed description here will be omitted, but the overall operation will be generally described.

For example, when the brake handle 35 is operated in order to cause the brake to act, a detection signal corresponding to the fact that that operation has been detected by the brake lever actuation switch (not shown) that detects operation of the brake handle 35 is inputted to the electronic control unit 51. At the same time, brake fluid of an oil pressure corresponding to operation of the brake handle 35 is supplied from the front brake master cylinder 1 to the front wheel cylinder 3, brake force is generated, and the brake force acts on the front wheel 37.

Then, in the electronic control unit 51, when it is judged that antilock brake control is necessary, the first electromagnetic valve 7 is excited, the first main oil pressure tube 5 is placed in a non-communicated state, and the oil pressure of the front wheel cylinder 3 is held at a constant. Then, in the electronic control unit 51, when it is judged that the brake should be eased, the front reservoir inflow control-use electromagnetic valve 15 is excited. As a result, the brake fluid of the front wheel cylinder 3 is discharged to the front reservoir 16 via the front reservoir inflow control-use electromagnetic valve 15, and the brake is eased.

At the same time, the motor 32 is driven by the electronic control unit 51 via the motor drive circuit 41, and the brake fluid stored in the front reservoir 16 is sucked up by the motion of the plunger 33a and refluxed to the front brake master cylinder 1.

It will be noted that when the brake pedal 36 is operated, brake force with respect to the wheel 38 is obtained in basically the same manner as in the case of the brake handle 35, and alleviation of the brake force is performed, so description here will be omitted.

Next, a first example of brake control processing that is executed by the electronic control unit 51 in this configuration will be described with reference to the sub-routine flowchart shown in FIG. 2.

When processing is started, first, it is determined whether or not a first flag F1, which is for distinguishing whether or not a state where a pressure increase gradient of brake force has been reduced in comparison to normal times is being held, is a predetermined value—for example, "1", which represents that the pressure increase gradient of the brake force is being held in a state where it has been reduced in comparison to normal times (refer to step S100 of FIG. 2).

In step S100, when it is determined that F1 is "1", that is, when it is determined that a state where the pressure increase gradient of the brake force has been reduced in comparison to normal times is being held (in the case of YES), then the sub-routine proceeds to the processing of later-described step S108, and when it is determined that F1 is not "1" (in the case of NO), or in other words when F1=0, then this means that the pressure increase gradient of the brake force is in a state where it is a norm size, and the sub-routine proceeds to the processing of next-described step S102.

In step S102, it is determined whether or not detection of lifting of the rear wheel 38 has ended, that is, in other words, whether or not the rear wheel 38 has landed.

Here, it is assumed that the two-wheeled motor vehicle brake control system to which the brake control processing in the embodiment of the present invention is applied includes a rear wheel lifting detection function. That is, a program for rear wheel lifting detection is executed by the electronic control unit 51, and when it is determined that rear wheel lifting has occurred, then a detection signal is generated inside the electronic control unit 51, and this detection signal becomes a predetermined level—for example, a logic value High—while rear wheel lifting continues. It is not necessary for this rear wheel lifting detection processing to be specific to the invention of the present application and it may be publicly known rear wheel lifting detection processing. That is, as this rear wheel lifting detection method, for example, the method (JP-A-2002-29403) pertaining to the proposal of the applicant of the present application, which calculates a pseudo vehicle body velocity on the basis of wheel velocity and judges rear wheel lifting by the magnitude of vehicle body deceleration calculated from that pseudo vehicle body velocity, is suitable.

Consequently, as for the determination of whether or not lifting detection has ended in step S102, similarly determining whether or not output of a detection signal that is generated by the aforementioned rear wheel lifting detection processing that is executed by an unillustrated main routine has ended is suitable.

When it is determined in this manner that output of the rear wheel lifting detection signal has ended, or in other words when it is determined that the rear wheel 38 has landed (in the case of YES), then the flag F1 is set to "1" (refer to step S104 of FIG. 2) and the sub-routine proceeds to the processing of step S106. On the other hand, in step S102, when it is determined that output of the rear wheel lifting detection signal has not ended (in the case of NO), then the series of processing is ended, the subroutine returns to the unillustrated main routine, other processing is executed, and thereafter the present processing is started and repeated beginning with the processing of step S100.

In step S106, reduction of the brake pressure, that is, in other words, reduction of the pressure increase gradient of the wheel cylinder pressure is performed.

Here, reduction of the pressure increase gradient of the wheel cylinder pressure will be described with reference to FIG. 3.

Figure 3A:
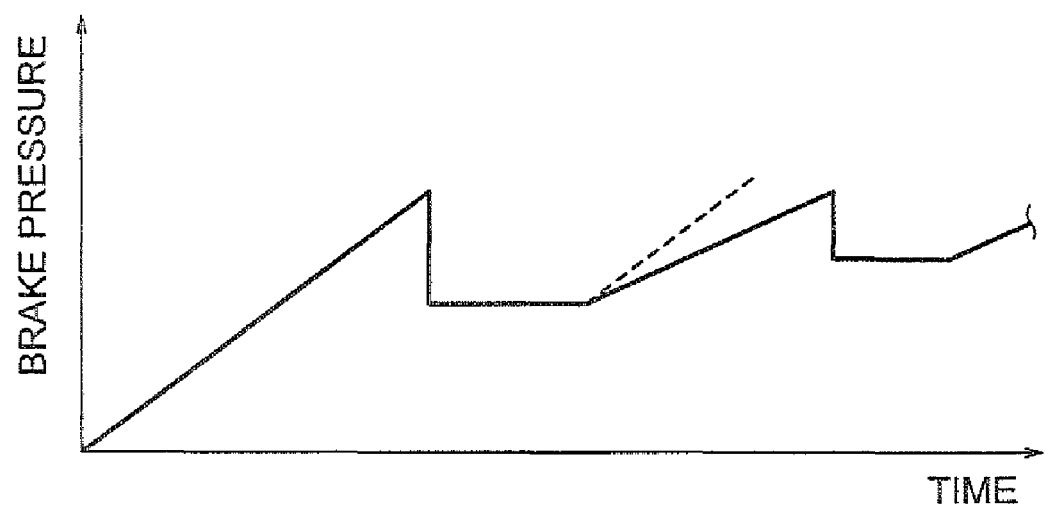
FIG. 3 is a Characteristic line diagrams showing examples of changes in a rear wheel lifting detection signal and a brake pressure in the first brake control processing, with FIG. 3(A) being a characteristic line diagram showing an example of a change in a brake pressure of a front wheel and FIG. 3(B) being a waveform diagram showing an example of output of a detection signal that is generated inside the electronic control unit by rear wheel lifting detection processing.
Figure 3B:
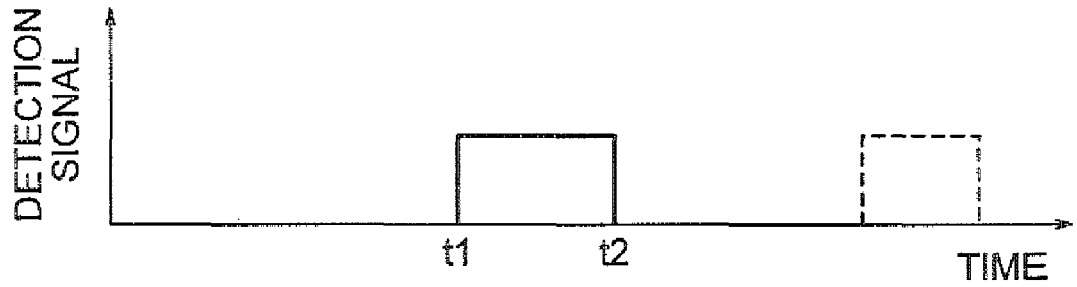

FIG. 3(A) is a characteristic line diagram showing an example of a change in the brake pressure of the front wheel 37, or in other words the wheel cylinder pressure, and FIG. 3(B) is a waveform diagram showing an example of output of the detection signal that is generated inside the electronic control unit 51 by the rear wheel lifting detection processing.

First, in FIG. 3, the rear wheel lifting detection signal corresponding to a logic level High at time t1 arises because of an increase in the brake pressure (wheel cylinder pressure) with respect to the front wheel 37 most recent thereto (refer to FIG. 3(A) and FIG. 3(B)). Additionally, the pressure increase gradient of the wheel cylinder pressure in this case is based on normal brake control.

Then, in FIG. 3, assuming that time t2 is a point in time when it is determined that output of the rear wheel lifting detection signal has ended in step S102, then the processing of step S104 is executed as mentioned previously, and then reduction of the pressure increase gradient of the brake pressure is performed. That is, specifically, the front reservoir inflow control-use electromagnetic valve 15 is placed in an opened state by the electronic control unit 51 via the electromagnetic valve drive circuit 42, a predetermined amount of brake fluid is discharged from the front wheel cylinder 3 to the front reservoir 16 such that the pressure increase gradient of the wheel cylinder pressure becomes a desired predetermined gradient that is smaller than the gradient in normal control, and reduction of the pressure increase gradient is performed.

As a result, when the brake is operated immediately thereafter (immediately after time t2 in FIG. 3), the brake force rises by a pressure increase gradient that is small in comparison to the pressure increase gradient during normal times (refer to FIG. 3(A)), and when it is a normal pressure gradient (refer to the dotted gradient in FIG. 3(A)), the rear wheel lifting detection signal is outputted (refer to the dotted waveform in FIG. 3(B)), but output thereof is avoided.

It will be noted that the extent to which reduction of the pressure increase gradient is to be performed, or in other words how long the front reservoir inflow control-use electromagnetic valve 15 is to be placed in an opened state, is determined in response to the specific conditions of the vehicle and is not unequivocally determined. Consequently, it is suitable to set an optimum value on the basis of simulations and experiments in response to the specific conditions of individual vehicles.

Next, it is determined whether or not vehicle body deceleration has fallen below a predetermined value K1 (refer to step S108 of FIG. 2). That is, first, pseudo vehicle body velocities are computed and calculated using a predetermined arithmetic expression on the basis of the detection signals of the wheel velocity sensors 45 and 46 that have been inputted to the electronic control unit 51.

Additionally, vehicle body deceleration is determined as being equal to $(V1-V2)/\Delta t$ assuming that V1 represents a pseudo vehicle body velocity at a given time and that V2 represents a pseudo vehicle body velocity after the elapse of a predetermined unit amount of time (e.g., one second) $\Delta t$ from that point in time.

It will be noted that, when these pseudo vehicle body velocities and vehicle body deceleration are calculated in unillustrated other processing that is executed by the electronic control unit 51, such as rear wheel lifting detection processing, then it is suitable to appropriate those.

Then, in step S108, when it determined that vehicle body deceleration that has been determined as mentioned above has fallen below the predetermined value K1 (in the case of YES), then it is determined that the potential for rear wheel lifting has dropped, and changing of the pressure increase gradient of the wheel cylinder pressure that was performed in step S106 is stopped—that is, reduction of the pressure increase gradient is stopped (refer to step S110 of FIG. 2).

Next, the flag F1 is set to "0", the series of processing is ended, and the sub-routine returns to the unillustrated main routine (refer to step S112 of FIG. 2).

On the other hand, in step S108, when it is determined that vehicle body deceleration has not fallen below the predetermined value K1 (in the case of NO), then it is determined that there is still the potential for rear wheel lifting, the pressure increase gradient of the wheel cylinder pressure that was changed in step S106 is maintained (refer to step S114 of FIG. 2), the series of processing is ended, and the sub-route returns to the unillustrated main routine.

Next, a second example of brake control will be described with reference to FIG. 4. It will be noted that the same numbers will be given to steps having the same processing content as the steps shown in FIG. 2, detailed description of those steps having the same processing content will be omitted, and the points that are different will be mainly described below.

Whereas the first example is configured such that, when rear wheel lifting is detected, the pressure increase gradient of the wheel cylinder pressure immediate thereafter is reduced over what it is normally, the second example is different in that it is configured to use vehicle body deceleration in judging whether or not to reduce the pressure increase gradient of the wheel cylinder pressure.

That is, when processing is started, first, it is determined whether or not vehicle body deceleration has exceeded a predetermined value K2 (refer to step S102A of FIG. 4), and when it is determined that vehicle body deceleration has exceeded the predetermined value K2 (in the case of YES), then the sub-routine proceeds to the processing of step S106. On the other hand, in step S102A, when it is determined that vehicle body deceleration has not exceeded the predetermined value K2 (in the case of NO), then the series of processing is ended, the sub-routine returns to the unillustrated main routine, other processing is executed, and thereafter the present processing is started and repeated beginning with the processing of step S102A.

Then, in step S106, reduction of the pressure increase gradient of the wheel cylinder pressure is performed as described in the first example shown in FIG. 2.

Next, in step S108A, it is determined whether or not vehicle body deceleration has fallen below a predetermined value K3, and when it is determined that vehicle body deceleration has fallen below the predetermined value K3 (in the case of YES), then the sub-routine proceeds to step S110 and reduction of the pressure increase gradient is stopped, and when it is determined that vehicle body deceleration has not fallen below the predetermined value K3 (in the case of NO), then the pressure increase gradient of the wheel cylinder pressure is held at the gradient that was reduced in step S106, the series of processing is ended, and the sub-routine returns to the unillustrated main routine.

It will be noted that, here, the predetermined value K2 in step S102A and the predetermined value K3 in step S108A may be the same (K2=K3), or the value of K3 may be set to a value that is slightly lower than K2 to dispose a so-called hysteresis and stabilize control.

It will be noted that, instead of vehicle body deceleration, which is a judging index for judging whether or not to reduce the pressure increase gradient of the wheel cylinder pressure in the aforementioned second example, the wheel cylinder pressure may also be used as a judging index.

Figure 4:
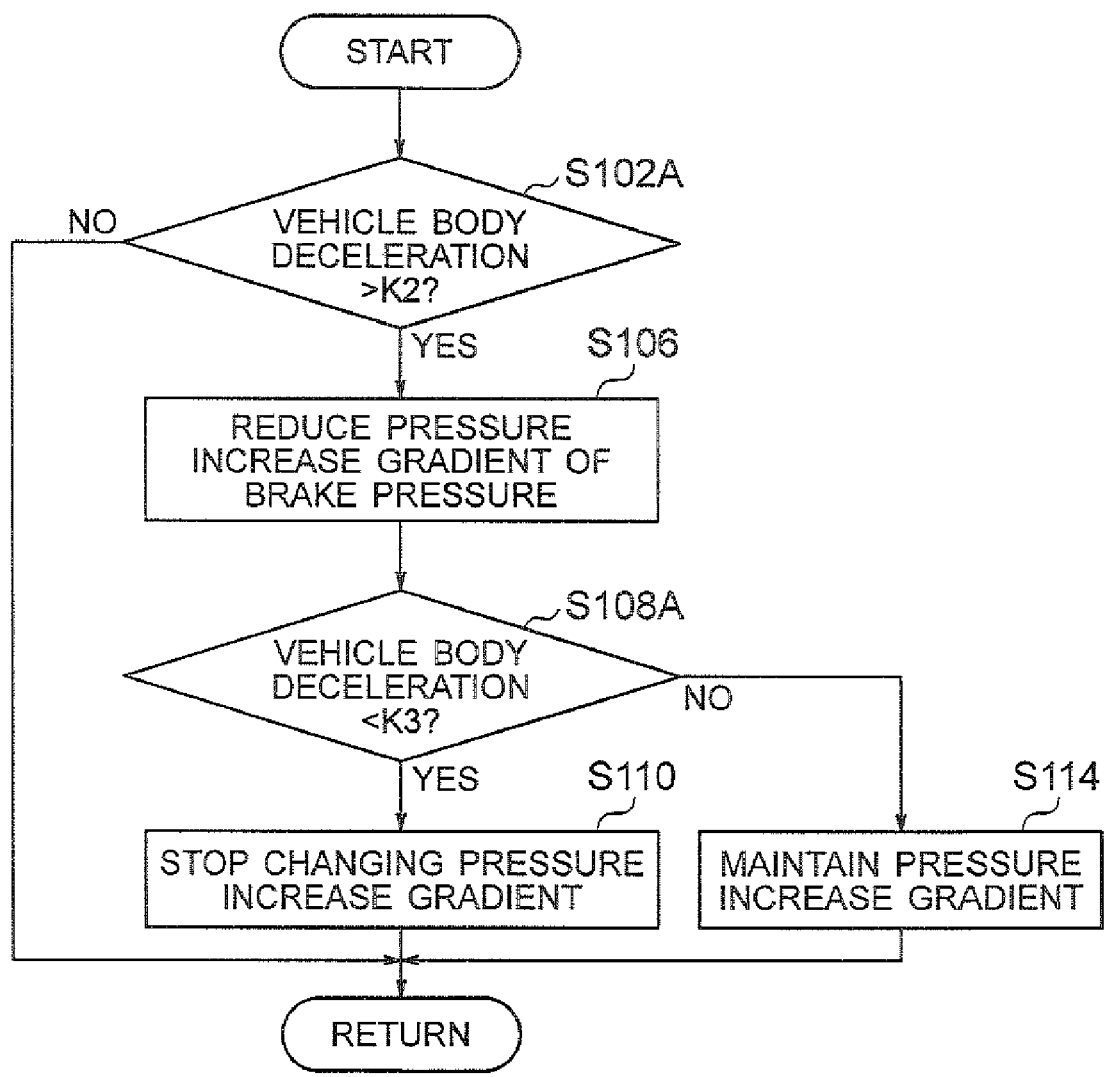
FIG. 4 is a sub-routine flowchart showing a processing procedure of second brake control that is executed by the electronic control unit of the two-wheeled motor vehicle brake control system shown in FIG. 1.

That is, that brake control system may also be configured such that, in step S102A of the processing procedure shown in FIG. 4, instead of determining whether or not vehicle body deceleration has exceeded the predetermined value K2, it is determined whether or not the pressure of the front brake master cylinder 1 that has been detected by the pressure sensor 47 has exceeded a predetermined value K2', and in step S108A, instead of deterring whether or not vehicle body deceleration has fallen below the predetermined value K3, it is determined whether or not the pressure of the front brake master cylinder 1 that has been detected by the pressure sensor 47 has fallen below a predetermined value K3'. By configuring the brake control system in this manner, the brake control system can be configured to perform reduction of the pressure increase gradient of the wheel cylinder pressure when a high wheel cylinder pressure is detected by basically the same procedure as the processing procedure shown in FIG. 4.

The present invention can prevent re-lifting of a rear wheel of a two-wheeled motor vehicle after the rear wheel has lifted because of a brake operation and landed, and can be applied to two-wheeled motor vehicle brake control of a vehicle body structure where lifting of the rear wheel occurs easily.

According to the present invention, when the potential for re-lifting of the rear wheel to occur is large, the pressure increase gradient of the wheel cylinder pressure of the front wheel that corresponds to the brake pressure is reduced; thus, the invention provides the effects that it can reliably prevent re-lifting of the rear wheel after landing of the rear wheel that is caused by the pressure increase gradient of the front wheel brake pressure or the size of vehicle body deceleration, appropriate control of the brake pressure can be realized, and further securement of the safety of the vehicle and the rider becomes possible.

What is claimed is:

1. A two-wheeled motor vehicle brake control method for a two-wheeled motor vehicle having an electronic control unit, said method comprising:
   using the electronic control unit to execute a program for detecting rear wheel lifting,
   reducing a pressure increase gradient of a wheel cylinder pressure of a front wheel when rear wheel lifting is no longer being detected,
   wherein reducing a pressure increase gradient does not start until after rear wheel lifting is no longer being detected and after landing of the rear wheel.

2. The two-wheeled motor vehicle brake control method of claim 1, wherein the pressure increase gradient that has been reduced is maintained until it is determined that vehicle body deceleration has fallen below a predetermined value.

3. A two-wheeled motor vehicle brake control system configured to be capable of transmitting oil pressure arising in a front brake master cylinder in response to operation of a first brake operator to a front wheel cylinder via an oil pressure system, capable of transmitting oil pressure arising in a rear brake master cylinder in response to operation of a second brake operator to a rear wheel cylinder via an oil pressure system, and capable of discharging brake fluid of the front wheel cylinder to a front reservoir as desired,
   wherein the brake control system is configured to determine whether or not output of a detection signal that is generated by detection of lifting of a rear wheel has ended and, when it is determined that output of the detection signal has ended, reduce a pressure increase gradient of a wheel cylinder pressure of a front wheel,
   wherein the brake control system is configured such that reducing a pressure increase gradient does not start until after rear wheel lifting is no longer being detected and after landing of the rear wheel.

4. The two-wheeled motor vehicle brake control system of claim 3, wherein the brake control system is configured to determine whether or not vehicle body deceleration has fallen below a predetermined value after reduction of the pressure increase gradient has been performed and maintain the pressure increase gradient that has been reduced until it is determined that vehicle body deceleration has fallen below the predetermined value.

* * * * *